Nov. 7, 1933.  E. G. HILL  1,934,671
CLUTCH CONTROL DEVICE FOR MOTOR VEHICLES
Filed Oct. 22, 1932  5 Sheets-Sheet 1

Inventor
EDWARD G. HILL
By C. L. Parker Jr.
Attorney

Nov. 7, 1933.   E. G. HILL   1,934,671
CLUTCH CONTROL DEVICE FOR MOTOR VEHICLES
Filed Oct. 22, 1932   5 Sheets-Sheet 3

Inventor
EDWARD G. HILL
By C. L. Parker Jr.
Attorney

Patented Nov. 7, 1933

1,934,671

UNITED STATES PATENT OFFICE 1,934,671

CLUTCH CONTROL DEVICE FOR MOTOR VEHICLES

Edward G. Hill, Chicago, Ill., assignor to Hill Engineering Corporation, Richmond, Va., a corporation of Virginia Application October 22, 1932. Serial No. 639,110

46 Claims. (Cl. 192—.01)

This invention relates to clutch control devices for motor vehicles.

It has been proposed to employ the partial vacuum present in the intake manifold of a motor vehicle for supplying the force necessary for disengaging the clutch of a motor vehicle, and to provide suitable valve mechanisms for controlling the return of the clutch elements into engagement with each other. Several forms of mechanisms for accomplishing this result are shown and described in my copending applications Serial Nos. 480,598, filed September 8, 1930, 537,155, filed May 13, 1931, and 600,019, filed March 19, 1932, and the copending applications of Edward G. Hill and Henry W. Hey, Serial Nos. 578,394, filed December 1, 1931, and 587,578, filed January 19, 1932.

The controlling of the return movement of the clutch elements into operative engagement to simulate conventional practice has been found to be the most difficult problem involved in automatic clutch control. For example, it is necessary for satisfactory clutch operation that the clutch elements be released after disengagement for relatively rapid movement approximately to the point of engagement of the clutch elements and to check the elements at such point prior to permitting full clutch engagement. Moreover, it is necessary to provide some means for controlling the movement of the clutch elements into full engagement from the checking point referred to in order that smooth final engagement may take place.

Means for permitting the clutch elements to move automatically approximately to the point of engagement and then for checking further movement of the elements is shown in several of the copending applications referred to. For example, in the application of Edward G. Hill and Henry W. Hey, Serial No. 587,578, automatic means is provided for checking the movement of the clutch elements automatically at the point of engagement regardless of the absence of movement of the clutch elements toward each other, the initial contact of the clutch elements being utilized for operating the checking means. In the copending application of Edward G. Hill and Henry W. Hey, Serial No. 578,394, automatic means operated in accordance with throttle opening in proportion to engine speed is disclosed for controlling the rate of movement of the clutch elements into full engagement.

The forms of apparatus particularly referred to have been found to be fully practicable in operation, but they do not, in themselves, provide all of the features of operation desirable in an apparatus of this character. For example, it is desirable to provide fixed leakages to overcome accidental leakages in certain forms of the apparatus to prevent the creeping of the clutch operating device which would otherwise result in the "riding" of the clutch bearing. Moreover, it is desirable to provide means for increasing the maneuverability of the vehicle, as for example, when leaving a parking space, under which conditions it frequently is necessary to provide partial clutch engagement to effect slow movement of the vehicle and then to permit slippage of the clutch prior to further engagement thereof. The desirability of providing means for increasing the maneuverability of the vehicle through more complete clutch control under all conditions will be apparent to those skilled in the art.

An important object of the present invention is to provide an automatic valve mechanism for vacuum operated clutch control devices wherein a fixed bleed to the atmosphere is provided during normal operation of the vehicle to prevent any accidental leakages in the valve mechanism from causing partial operation of the power device connected to the vehicle clutch which otherwise would result in the "riding" of the clutch bearing and the slipping of the clutch.

A further object is to provide a novel form of valve mechanism wherein complete and automatic control of the clutch is afforded under all operating conditions to improve the maneuverability of the vehicle by fully simulating any conventional clutch operation.

A further object is to provide a novel form of valve mechanism including a differential pressure power device and suitable automatic control valve mechanism therefor, valve mechanism being controllable by operation of the throttle of the vehicle engine to release the clutch elements for movement toward engaged position and then checking them approximately at the point of engagement, and wherein the valve mechanism is automatically operable in accordance with subsequent throttle control whereby further depression of the throttle will release the clutch elements for completely controlled movement into full engagement and for wholly or partially releasing the clutch elements upon a whole or partial release of the accelerator pedal.

A further object is to provide automatic valve mechanism of the character referred to which is operative for connecting the differential pressure power device to the atmosphere during the normal operation of the vehicle to overcome any accidental leakages in the valve mechanism, and for cutting off communication with the atmosphere and connecting the power device to the intake manifold automatically upon the releasing of the accelerator pedal.

A further object is to provide a valve mechanism for differential pressure operated clutch control devices wherein rapid and smooth starts are provided together with means for preventing the lunging of the vehicle due to too rapid complete engagement of the clutch elements.

A further object is to provide an apparatus of the character referred to wherein the mechanism automatically provides two checking points for the clutch elements the second of which occurs automatically immediately prior to full engagement of the clutch elements to prevent the vehicle from lunging due to a sudden substantial depression of the accelerator pedal which otherwise would bring the clutch elements substantially instantaneously into complete engagement.

A further object is to provide a vacuum operated main valve for connecting the differential pressure device to the intake manifold and a bleed valve for connecting the differential pressure power device to the atmosphere after movement of the clutch elements has been checked in the manner referred to, the main valve and bleed valve being connected to the intake manifold at points adjacent the butterfly valve whereby the main valve operates in advance of the bleeder valve upon initial operation of the accelerator to permit the clutch elements to be moved to either checking point prior to the bleeding of the differential pressure device to the atmosphere.

Other objects and advantages of the invention will become apparent during the course of the following description.

In the drawings I have shown one embodiment of the invention. In this showing,

Figure 10 is a section on line 10—10 of Figure 4, and, Figure 11 is a schematic sectional view of the valve mechanism.

Figure 1:
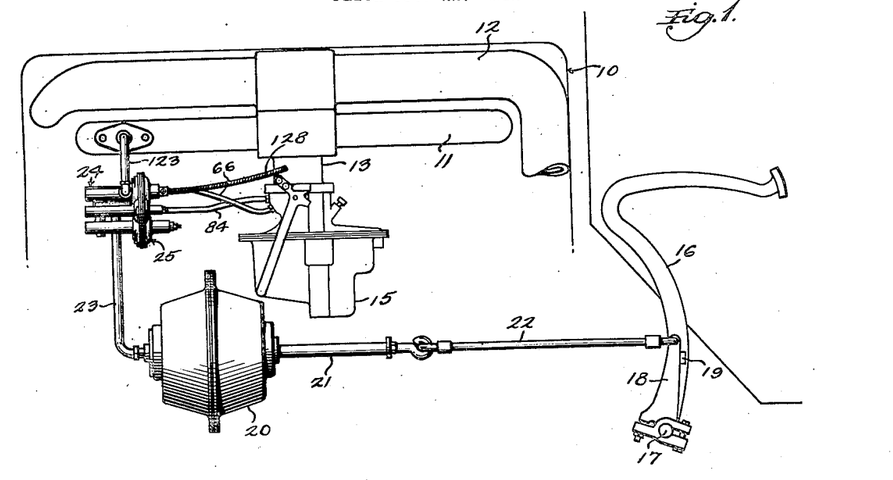
Figure 1 is a side elevation showing the connection of the apparatus to the vehicle engine and clutch pedal.

Referring to Figure 1 the numeral 10 designates a motor vehicle engine as a whole including an intake manifold 11 and exhaust manifold 12. The intake manifold is provided with the usual riser 13 having a butterfly valve or throttle 14 therein, the riser being connected at its lower end to a carburetor 15.

The vehicle is provided with the usual clutch (not shown) operative through the medium of a clutch pedal 16. As will be apparent, the clutch may be of the conventional type wherein the clutch plates have a normal bias toward each other through the provision of the usual springs. The pedal 16 is rotatable about the clutch shaft 17, and an arm 18 is fixed to the shaft to impart movement thereto. The pedal 16 is provided with a lug 19 engageable with the arm 18 to impart movement to the latter upon depression of the clutch 16. It will be apparent, however, that the arm 18 is freely movable to disengage the clutch without imparting movement to the pedal 16.

Referring to Figure 1, the numeral 20 designates a power device as a whole which may be of any desirable type such, for example, as the differential pressure devices shown in the copending applications of Edward G. Hill and Henry W. Hey, Serial Nos. 578,394 and 587,578 referred to above. Inasmuch as the specific form of differential pressure power device may be of any desired type, it is considered unnecessary to illustrate it in the drawings. The movable element of the power device is connected to a piston rod 21, and this rod is connected, in turn, by a rod or cable 22 to the upper end of the arm 18. The rear side of the power device communicates with the atmosphere, and the forward end communicates with one end of a vacuum conduit 23.

Referring to Figures 2 to 10 inclusive, the numeral 24 designates a valve casing as a whole provided with a cap or head 25. All of the control valves for the power device are contained within the valve casing 24 and all are differential pressure operated in a manner to be described. Aside from the lock out valve to be referred to later, the valve mechanism comprises generally four valves, namely (1) a main valve operable for connecting the power device to the intake manifold to disengage the clutch elements, (2) a check valve automatically operative when the clutch elements return to or slightly past the point of engagement for checking the movement of the clutch elements, (3) a bleed valve to control the rate of movement of the clutch elements into operative engagement with each other, and (4) a bleeder check valve controlling the operation of the bleed valve for purposes to be described in detail later.

The valve casing 24 is preferably an integral casting of the shape indicated in the drawings. This casting is provided with a cylinder 26 in which is arranged the main valve including spaced heads 27 and 28 joined by a reduced shank 29. Below the main valve, the valve casing is further provided with a check valve 30 carried by a stem 31. A head 32 forms a part of the check valve as a whole and is connected to the main checking valve head by a reduced shank 33. The check valve structure operates in a cylinder 34 formed in the valve casing.

At one side, the valve casing is provided with a cylinder 35 in which a bleed valve is operative, and this valve includes integral spaced heads 36 and 37 joined by a slightly reduced shank 38. The head 37 is carried by an integral shank 39. Partially for the purpose of operating as a check on the bleed valve to smooth out the operation of the vehicle, another valve, which may be termed the bleeder check valve, is reciprocable in a cylinder 40 formed in the valve casing. The bleeder check valve comprises an intermediate head 41 having a small annular groove 42 therein and an integral spaced head 43 is connected to the head 41 by a reduced shank 44. An inner head 45 is connected by a slightly reduced shank 46 to the head 41, as clearly shown in Figure 10.

The valve casing and head 25 are provided with coacting annular flanges designated respectively by the numerals 47 and 48. A diaphragm 49 is arranged between these flanges and the latter are clamped against opposite sides of the diaphragm by screws 50. For the sake of simplicity and economy, a single diaphragm element 49 is employed, but this element serves to provide four separate and distinct diaphragms to operate the four valves referred to. For the purpose of illustration, the four diaphragms referred to will be indicated by separate reference numerals since they separately perform their functions and may be formed as separate diaphragms.

Figure 5:
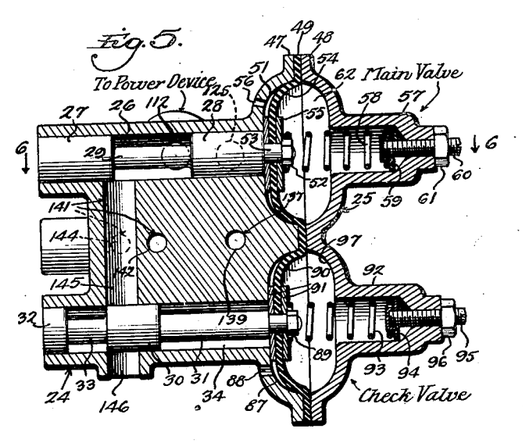
Figure 5 is a longitudinal sectional view through the valve mechanism taken on line 5—5 of Figure 4.
Figure 6:
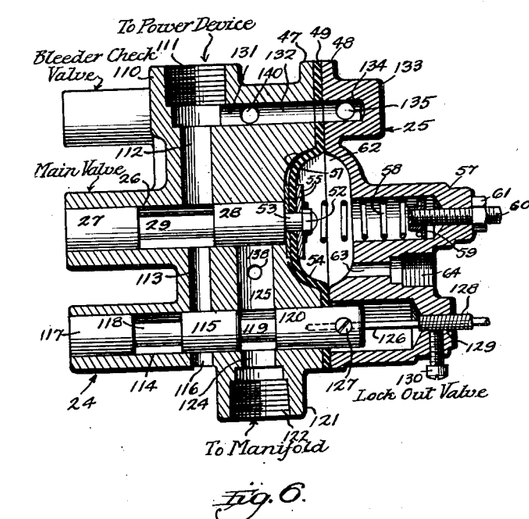
Figure 6 is a similar view on line 6—6 of Figure 5.

Referring to Figure 6, the numeral 51 designates a pocket or depression formed on the face of the valve casing 24 adjacent the head 25, concentric with the main valve. A nut 52 mounted on the end of a small shank 53 carried by the main valve serves to secure the latter to a diaphragm 54 normally arranged in the recess 51. Washers 55 are preferably arranged on opposite sides of the diaphragm 54. The recess 51 communicates with the atmosphere through a suitable port 56 (see Figure 5). The valve head 25 carries an integral hollow extension 57 in axial alinement with the main valve and houses a spring 58 operable for normally retaining the diaphragm 54 inwardly with respect to the recess 51. The outer end of the spring seats against a washer 59, and the tension of the spring is adjustable by means of a screw 60. A lock nut 61 is threaded on the screw 60 to secure the latter in adjusted positions.

Referring to Figure 6, it will be noted that the valve head 25 is provided with a depression or recess 62 into which the diaphragm 54 is movable under conditions to be described. The valve head is provided with a passage 63 communicating at one end with the recess 62, and the outer end of the passage 63 is threaded as at 64. The threaded end 64 of the passage is adapted for connection with a suitable fitting 65 adapted for connecting the passage 63 to one end of a pipe or conduit 66.

Figure 2:
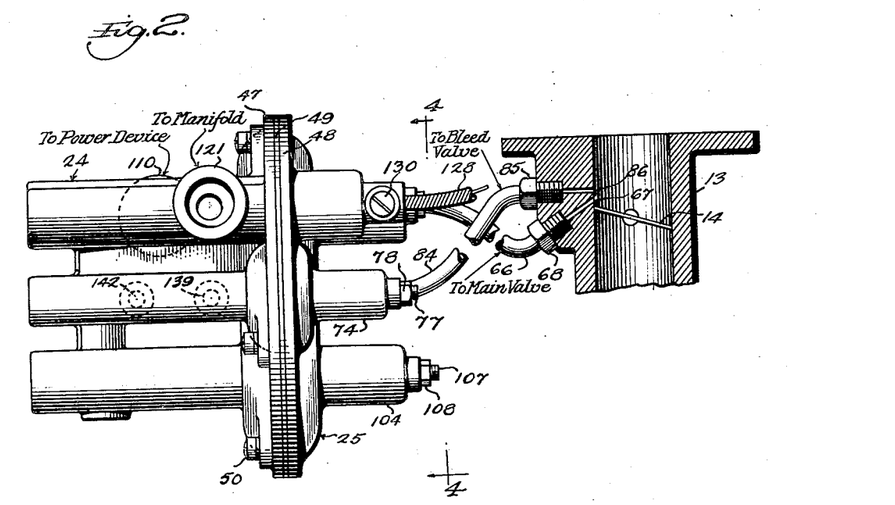
Figure 2 is a side elevation of the valve mechanism showing the connection of the main valve and bleeder valve to the intake manifold adjacent the butterfly valve.

The manifold riser 13 is provided with an opening 67 communicating therewith just above the adjacent edge of the butterfly valve 14 when the latter is in closed or idling position. A fitting 68 is tapped into the manifold casting to communicate with the passage 67 and to connect the pipe 66 thereto, as shown in Figure 2. It will be apparent that when the butterfly valve is closed, maximum vacuum is present in the manifold, and such vacuum is communicated through passage 67, pipe 66 and passage 63 to the diaphragm chamber 62, whereupon differential pressure on opposite sides of the diaphragm 54 operates it against the tension of the spring 58.

Figure 10:
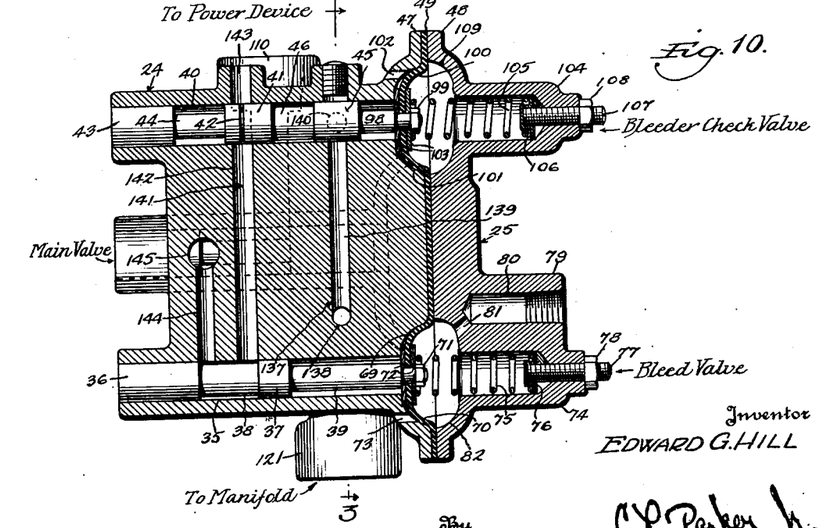

The face of the valve casing adjacent the head 25 is also provided with a recess 69 concentric with the bleed valve and in which is normally arranged a diaphragm 70 forming a part of the diaphragm element 49. The stem 39 has a reduced end on which is threaded a nut 71 for securing the diaphragm 70 to the bleed valve, and suitable washers 72 are arranged on opposite sides of the diaphragm as shown in Figure 10. The recess 69 is vented to the atmosphere through a port 73.

The valve head 25 is provided with a cylindrical extension 74 in axial alinement with the bleed valve, and a spring 75 is arranged in this extension with one end in engagement with the outer washer 72 to urge the diaphragm 70 inwardly into the recess 69. A washer 76 seats against the outer end of the spring 75 and tension of the spring is adjusted by a screw 77. A lock nut 78 is adapted to lock the screw 77 in adjusted positions.

Figure 9:
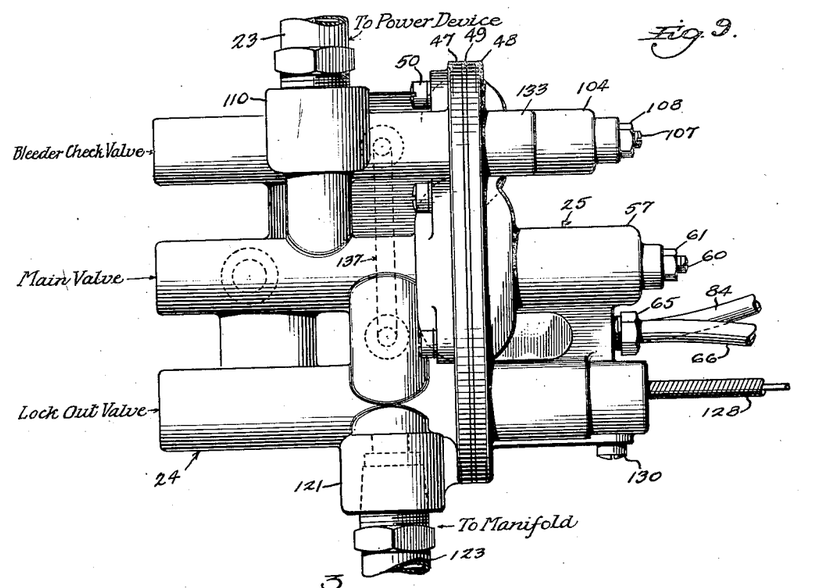
Figure 9 is a plan view of the valve mechanism.

The valve head 25 is further provided with an integral extension 79 preferably extending laterally from the extension 74 and having a passage 80 therein, as shown in Figure 9. This passage communicates through another passage 81 with a recess or diaphragm chamber 82 formed in the inner face of the valve head to receive the diaphragm 70 when the latter is moved outwardly against the tension of the spring 75. A suitable fitting 83 is threaded in the extension 78 to connect the passage 80 to one end of a pipe 84. The other end of this pipe is connected by a suitable fitting 85 to the manifold riser 13 and communicates with the interior thereof through a passage 86 arranged slightly above the passage 67 previously described. Both passages 67 and 86 are subject to full manifold vacuum when the throttle is in idling position, and as the throttle is progressively opened it will be apparent that the opening 67 is first uncovered to be subjected to substantial atmospheric pressure, after which the passage 86 is similarly opened. The purpose for the arrangement of the passages 67 and 86 will be referred to later.

Referring to Figure 5, it will be noted that the face of the valve casing 24 which faces the valve head 25 is further provided with a depression 87 communicating with the atmosphere through a port 88. A nut 89 is threaded on the reduced end of the shank 31 for connecting the latter to a diaphragm 90 forming a part of the diaphragm element 49. Washers 91 also are preferably arranged against opposite sides of the diaphragm 90. The valve head 25 is provided with a cylindrical extension 92 containing a spring 93 having one end operative against the outer washer 91 to normally retain the diaphragm 90 in the recess 87. A spring seat 94 arranged against the outer end of the spring 93 is adjustable by a screw 95 adapted to be secured in selected positions by a lock nut 96. The diaphragm 90 is movable outwardly against the tension of the spring 93 in a manner to be described, in which case it moves into a recess or diaphragm chamber 97 formed in the inner face of the valve head 25.

The bleeder check valve also is diaphragm operated for a purpose to be described. A stem 98 is formed integral with the bleeder check valve head 45 and has a reduced end on which is threaded a nut 99. This nut secures the stem 98 to a diaphragm 100, also forming a part of the diaphragm element 49. The diaphragm 100 is normally arranged in a recess 101 formed in the adjacent face of the valve casing 24 and communicating with the atmosphere through a port 102. Washers 103 preferably engage opposite sides of the diaphragm 100 as shown in Figure 10. An integral cylindrical extension 104 is carried by the valve head 75 and houses a spring 105 having one end operative against one of the washers 103 to normally urge the diaphragm 100 into the recess 101. A spring seat 106 operates against the outer end of the spring 105, and the tension of the latter is adjustable by a screw 107 carrying the lock nut 108. Concentric with the bleeder check valve, the inner face of the valve head 25 is provided with a recess or diaphragm chamber 109.

Referring to Figure 6, the numeral 110 designates an integral boss carried by the valve housing and provided with a threaded opening 111 for connection with a suitable fitting leading to the conduit 23 previously described. It will be apparent that when the opening 111 is connected to the intake manifold in a manner to be described, differential pressure will be established in the power device 20 to disengage the clutch by transmitting movement to the arm 18. The opening 111 communicates with one end of a passage 112 extending horizontally from the valve casing 24 and communicating with the cylinders 26 in which the main valve is operative. At the opposite side of the main valve the valve casing is provided with a passage 113 which forms, in effect, a portion of the passage 112 and communicates with a cylinder 114 formed in the valve casing. A lock out valve is slidable in the cylinder 114 and comprises a main head 115 intermediate its length, adapted to open and close the passage 113. The port 116 is arranged in alinement with the passage 113 to connect the latter to the atmosphere when the valve head 115 is in one position. The head 115 is connected to a second head 117 by a reduced shank 118, and at its inner end, the head 115 is connected by a reduced shank 119 to an inner head 120.

The valve casing is provided at the side thereof opposite the boss 110 with a similar boss 121 internally threaded as at 122 for connection with a pipe 123 leading to the intake manifold 11 as shown in Figure 1. The valve casing is provided with a port 124 communicating between the threaded opening 122 and the lock out cylinder 114, and the shank 119 is arranged adjacent the port 124 when the parts are in the position shown in Figure 6. A passage 125 communicates between the cylinders 26 and 114, that is, the main valve and lock out cylinders, and is arranged in alinement with the port 124.

When the main valve diaphragm 54 is moved in a manner to be described to operative position, the space between the main valve heads 27 and 28 will afford communication between the passages 112 and 125, and thus the differential pressure device 20 will be connected to the intake manifold. It will be apparent that movement of the lock out valve to place the head 115 in alinement with the passages 124 and 125 will disconnect the intake manifold from all portions of the apparatus, while at the same time, the space between the heads 115 and 117 will afford communication between the passage 113 and the atmosphere through the port 116. Under such conditions, the differential pressure device 20 will be in comunication with the atmosphere and the clutch of the vehicle is subject to conventional foot operation. The lock out valve is adapted to be manipulated by means of a flexible wire 126 secured thereto by a set screw 127. A flexible tube 128 extends into an opening 129 in the valve head 25 and is secured in position by a set screw 130. The members 126 and 128 constitute a Bowden wire operating means for the lock out valve, and may lead to any suitable position adjacent the driver's seat for convenient operation.

Figure 8:
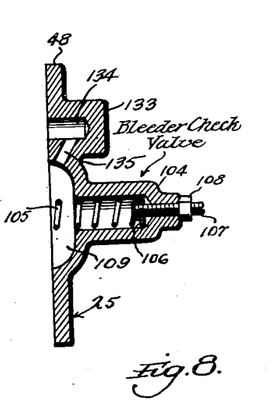
Figure 8 is a similar view on line 8—8 of Figure 4.

A passage indicated as a whole by the numeral 131 connects the opening 111 to the bleeder check diaphragm chamber 109. In this connection, attention is invited to Figure 11 wherein the valve mechanism as a whole is schematically illustrated, and the passage 131 is shown as comprising a pipe leading from the diaphragm conduit 23 to the bleeder check diaphragm chamber 109. The conduit 131 includes a passage 132 communicating at one end with the opening 11, and this passage accordingly is subject to pressure in the vacuum side of the power device 20. The valve head 25 is provided with an integral extension 133 having a passage 134 extending thereinto and forming a continuation of the passage 132. The passage 134 is shown in Figures 6 and 8, and referring to the latter figure, it will be noted that a short passage 135 extends from the passage 134 to the diaphragm chamber 109. Accordingly it will be apparent that the bleeder check valve is subject at all times to pressures present in the conduit 23, and hence to the pressures in the suction side of the power device 20.

The diaphragm connected to the check valve also is subject to pressures in the conduit 23. For this purpose, the diaphragm chambers 109 and 97 are in constant communication with each other through a conduit 136 illustrated in Figure 11 as comprising a pipe and in Figure 7 as a passage drilled angularly through the head 25 to directly connect the chambers 97 and 109. In this connection, it will be noted that the passages 135 and 136 are angularly arranged for production purposes, it being apparent that these openings are drilled after the valve head 25 has been cast. For reasons to be referred to, the spring 93 associated with the check valve diaphragm is under greater tension than the spring 105 of the bleeder check diaphragm, and upon increasing pressures in the conduit 23, and accordingly in the suction side of the power device 20, the check valve head 30 will close before the bleeder check will move downwardly inasmuch as a smaller differential pressure is necessary to hold the bleeder check diaphragm 100 in its upper position.

Figure 3:
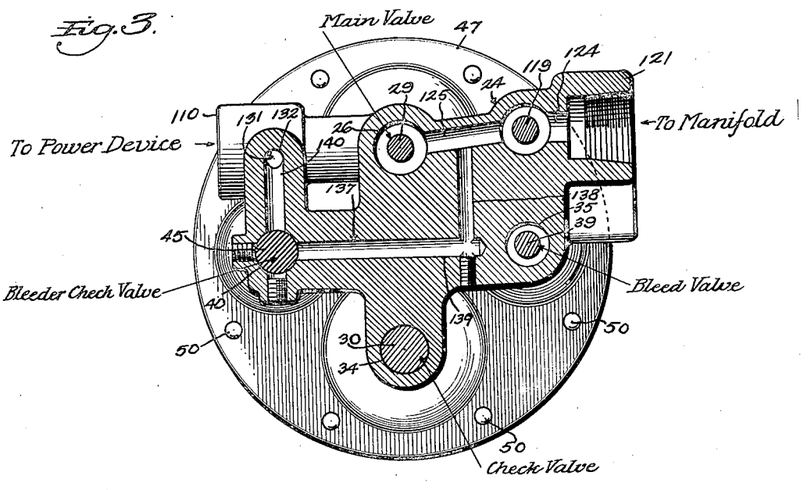
Figure 3 is a vertical sectional view through the valve mechanism taken on line 3—3 of Figure 10.
Figure 4:
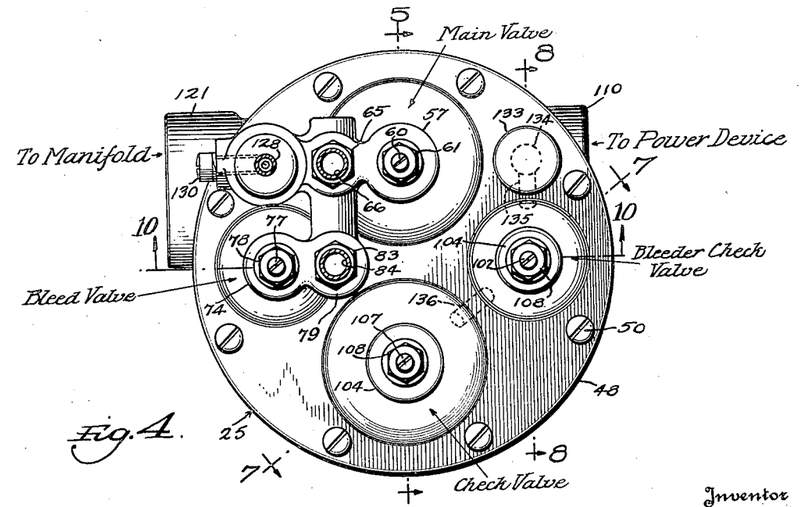
Figure 4 is a section on line 4—4 of Figure 2 showing the head of the valve structure in elevation.
Figure 11:
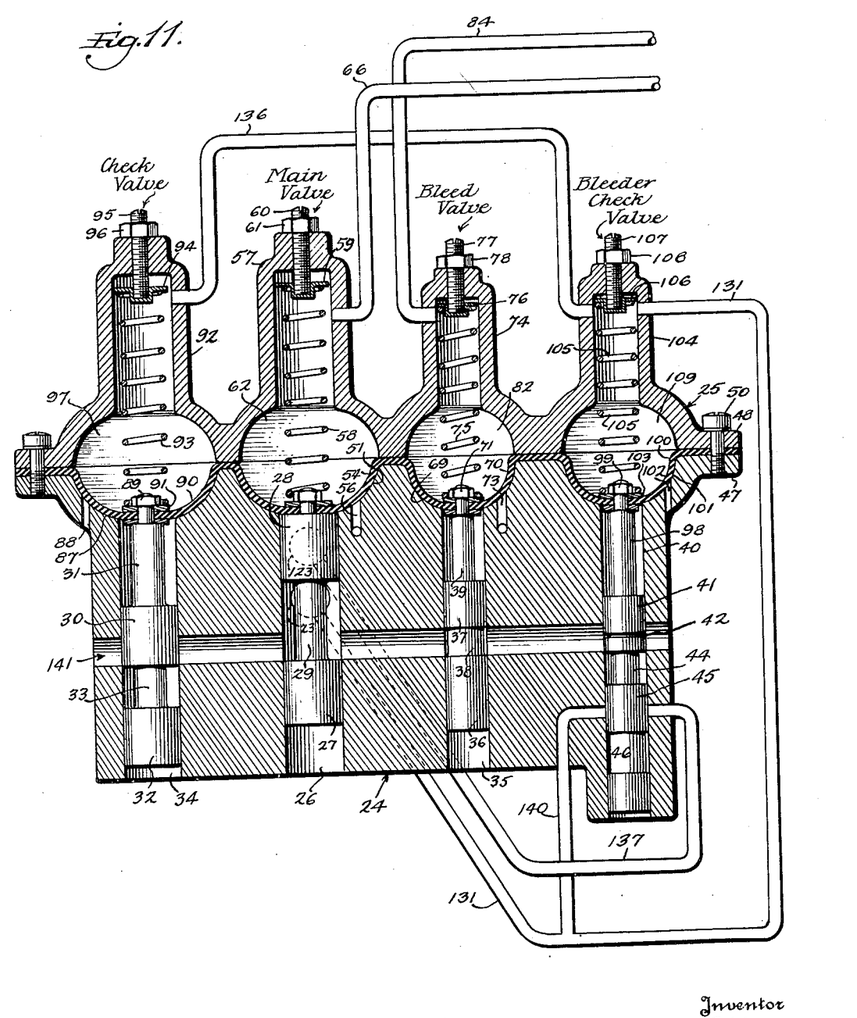

A passage indicated as a whole by the numeral 137 is adapted to afford communication between the intake manifold and the bleeder check cylinder 40 opposite the head 45 to be closed thereby when the latter is in the normal position shown in Figures 10 and 11. The passage 137 has been illustrated in Figure 11 as being formed of a pipe, while this passage is made up of a plurality of connecting passages in the valve casing 24. Referring to Figures 3 and 10, the passage 137 may be considered as a conduit formed of a passage 138 communicating at one end with the passage 125 and at its opposite end with a transverse passage 139. The latter passage leads to the bleeder check valve cylinder 40, and as previously stated, this passage is normally closed by the bleeder check valve head 45.

As previously stated, the valve body and valve head are provided with communicating passages 132 and 134 (see Figure 6) the former of which communicates with the opening 110 leading to the power device, while the passage 134 communicates with the diaphragm chamber 109. Referring to Figures 3 and 6, it will be noted that the bleeder check cylinder is provided with a conduit 140 leading to the passage 132, and this passage forms a part of the main conduit 131 as previously described. Thus it will be apparent that the diaphragm 100 of the bleeder check valve is influenced by the differential pressure power device and it is also influenced under some conditions to be referred to by pressure in the intake manifold connection when the valve head 45 uncovers the ends of the conduits 137 and 140.

A main control conduit 141 is provided for inter-relating the operation of the four control valves, and the conduit 141 has been shown in Figure 11 as extending straight through the valve body, intersecting the cylinders in which the various valves are operative. Referring to Figure 11 it will be noted that the conduit 141 has both ends open to the atmosphere. The check valve head 30 is arranged between the main valve and the adjacent open end of the conduit 141, while the bleeder check valve head 41 is arranged between the bleed valve and its adjacent end of the conduit 141. The check valve head 30 controls the admission of atmospheric pressure into the power device conduit 23, past the main valve, while the bleeder check valve head 41 acts as a check on the bleed valve to control the admission of air past the latter into the power device conduit 23. The specific operation of the parts will be later referred to in detail.

In the practical embodiment of the invention, the conduit 141 is made up of a plurality of inter-related passages extending through the valve body 24. Referring to Figures 5 and 10, it will be noted that the valve body is provided with a passage 142 forming one portion of the conduit 141. One end of the passage 142 communicates with the bleed valve cylinder 35 adjacent the shank 38, while the other end of this passage communicates with the bleeder check valve cylinder 40 adjacent the head 41, when the valve heads referred to are in the normal positions shown. The bleeder check cylinder 40 communicates with the atmosphere through a port or passage 143 forming a continuation of the passage 142, and the port 143 constitutes the right hand end of the conduit 141 as viewed in Figure 11.

A passage 144 is formed in the valve body parallel to and slightly spaced from the passage 142 and has one end communicating with the bleed valve cylinder 35 adjacent the shank 38 when the valve is in the position shown in Figure 10. Under such conditions, it will be apparent that the passages 142 and 144 communicate with each other when the space around the shank 38 uncovers the adjacent ends of the passages referred to, but the rate of communication will be limited due to the limited space around the shank 38.

Referring to Figure 5, it will be noted that the control conduit 141 also includes a passage 145 extending between the main valve cylinder 26 and the check valve cylinder 34. The valve body is further provided with a port 146 communicating between the check valve cylinder 34 and the atmosphere and arranged in alinement with the passage 145 to communicate therewith when the check valve head 30 is moved toward the right as viewed in Figure 5. The port 146 forms a part of the main control conduit 141 and corresponds to the left hand end of such conduit as the latter is viewed in Figure 11.

It will be apparent that the passage 144 communicates with the passage 145 intermediate the ends of the latter. In this connection it will be noted that in the structural views the passage 144 of the conduit 141 extending from the bleed valve cylinder 35 communicates with the passage 145 of the conduit 141 extending between the check valve cylinder 34 and the main valve cylinder 26, whereas in Figure 11, the conduit 141 is shown as being straight and continuous. The particular intercommunication point of the passages 144 and 145 however, is unimportant since the passage 144 could extend directly into the main valve cylinder 26 without affecting the operation of the device, and the connection has been so shown in Figure 11 for the purpose of clarity.

The operation of the apparatus is as follows:

Previous devices for utilizing the vacuum of an intake manifold for disengaging the clutch of a motor vehicle have been controlled by a main valve operable by the hand or foot of the operator, and some forms of the device have utilized movement of the connections between the throttle valve and the accelerator pedal for automatically opening the control valve to effect clutch disengagement whenever the accelerator pedal is released to move to motor idling position. It has been found that great sensitiveness in operation can be obtained without the use of any mechanical connections for actuating the main valve by depending upon variations in pressure existing in the intake manifold inwardly of the butterfly valve since such pressure has a variation ranging from the pressures of the atmosphere to the full manifold suction. It also has been found that increased sensitiveness in the operation of the bleed valve through which air is admitted into the differential pressure power device to bring the clutch elements into operative engagement with the bleed valve is controlled by the vacuum in the intake manifold adjacent the throttle or butterfly valve. Accordingly the main control valve and the bleed valve of the present apparatus are so controlled, and their orifices leading to the intake manifold or the manifold riser are so positioned with respect to the butterfly valve that the main valve orifice is subjected to atmospheric pressure as the butterfly valve opens, before the bleed valve orifice is subjected to such pressure. The purpose of this arrangement will become apparent from the following description.

Referring to Figures 1 and 6 it will be noted that the conduit 123 connects the intake manifold to the opening 122 of the valve body, and the connection to the intake manifold is arranged at a point remote from the butterfly valve so as to be subjected to minimum variations in pressure in the manifold. The lock out valve is shown in Figure 6 as being in the operative position wherein automatic clutch operation takes place, the port 124 communicating with the port 125 around the valve shank 119. Assuming that atmospheric pressure is present in the main valve diaphragm chamber 62, the main valve head 28 will be arranged in the position shown in Figure 6, covering the inner end of the passage 125. Accordingly the valve head will prevent communication between the passage 125 and the passage 112, and since the latter passage is connected to the differential pressure power device through the pipe 23, the power device will be disconnected from the intake manifold by the valve head 28. The clutch under such conditions will be in normal operation.

At the same time, the passage 113 (see Figure 6) is closed to the atmosphere by the lock out valve head 115, but the power device will be bled to the atmosphere through other means to be referred to later. The lock out valve, however, is operative for preventing automatic operation of the clutch whereby it is operative by the foot in accordance with conventional practice. By exerting a pull on the wire 126, the valve head 115 will be moved toward the right as viewed in Figure 6 to close communication between the port 124 and the passage 125, while the shank 118 will open communication between the atmospheric port 116 and the port 113. Thus direct communication will be afforded between the power device and the atmosphere through passages 112 and 113 and the port 116, and the clutch is free to be operated by the foot in accordance with conventional practice. In this connection attention is invited to Figure 1 of the drawings wherein it will be apparent that power actuation of the clutch operates the arm 18 without imparting movement to the pedal 16, whereas depression of the pedal 16 by the foot causes the lug 19 to operate the arm 18 and its connections to the power device. The latter device is freely movable however, due to its communication with the atmosphere in the manner stated.

The operation of the apparatus will be described with respect to its automatic features with the lock out valve assumed to be in the position shown in Figure 6. When the motor is ready to start the vehicle from a standstill, it will be apparent that the butterfly or throttle valve 14 will be arranged substantially in the position shown in Figure 2, the manifold being cut off from the atmosphere by the butterfly valve to such an extent that maximum vacuum is present in the manifold to act through the orifices 67 and 86. The former orifice is in communication with the main valve diaphragm chamber 62 through pipe 66 and passage 63 (see Figure 6) and accordingly the diaphragm 54 will be moved by atmospheric pressure on the opposite side acting through the port 56 shown in Figure 5. The atmospheric pressure accordingly moves the diaphragm 54, thus carrying the main valve to operative position wherein the head 28 uncovers the passage 125 to permit communication between the latter passage and the passage 112 around the shank 29. Since the power device 20 is connected by the conduit 23 to the opening 111, it will be apparent that the power device will be operated under such conditions to move the arm 18 and disengage the clutch elements. Under the same conditions, that is, assuming that the operator is ready to start the vehicle from a standstill and the throttle valve is closed, the partial vacuum in the intake manifold will be communicated to the bleed valve diaphragm chamber 82 through orifice 86, pipe 84, and passages 80 and 81. The bleed valve will be moved by atmospheric pressure acting through the port 73 against the diaphragm 70 to cause the valve head 36 to cover the passage 144, and thus close communication between the passages 142 and 144. Referring to Figures 10 and 11 it will be apparent that this action closes communication between the main valve cylinder 26 and the atmosphere past the bleed valve.

Figure 7:
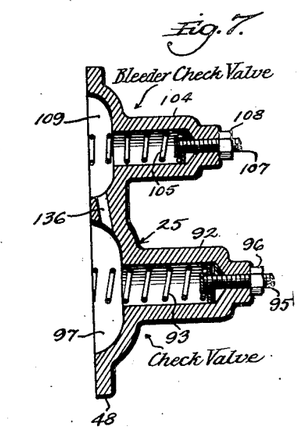
Figure 7 is a detail sectional view through the head of the valve mechanism taken on line 7—7 of Figure 4.

Under the conditions present in accordance with the foregoing description, the power device will be in operation due to its communication with the intake manifold and the clutch will be held disengaged pending further operation to be described. Moreover it will be apparent that vacuum will be maintained in the passage 112 which leads to the power device, and this vacuum will be communicated to the diaphragm chambers of the check valve and the bleeder check valve. Referring to Figures 6, 7 and 8, it will be noted that the passage 112 communicates with passages 132, 134 and 135, and accordingly the vacuum present in the passage 112 will be communicated to the bleeder check valve chamber 109 to operate its diaphragm 100 (Figure 10). Under such conditions the bleeder check valve head 45 will uncover the adjacent end of the passage 139, thus affording communication between passages 139 and 140. Since the passage 140 communicates with the passage 132 (see Figure 6) it will be apparent that communication will be established between the power device and the intake manifold through opening 111, passages 132 and 140, around the shank 46 of the bleeder check valve, through passages 139, 138 and 125, (see Figure 3) and thence into the manifold connection around the shank 119 of the lock out valve. This communication between the intake manifold and the power device is represented in Figure 11 by the conduit 137, through the bleeder check valve, through passage 140 and thence through pipe 131 to the conduit 23.

As previously stated, the bleeder check valve diaphragm chamber 109 communicates with the conduit 23 of the power device through the conduit 131, and the operation of the bleeder check valve through the opening of this conduit to the suction present in the conduit 23 operates the bleeder check valve to cause the head 45 thereof to afford communication between conduits 137 and 140, and accordingly the chamber 109 communicates with both the intake manifold and the conduit 23. The completion of this connection to the diaphragm chamber 109 in the structural embodiment of the invention will be apparent from Figures 3, 6, 7 and 8. Inasmuch as the intake manifold and the conduit 23 communicate through the conduit 137, and inasmuch as the passage 139 of this conduit communicates with the passage 140, it will be apparent that communication will be afforded to the bleeder check valve diaphragm chamber 109 through passages 132, 134 and 135 (see Figure 8). At this time it may be noted that the passage 136 affords constant communication between the diaphragm chambers of the check valve and the bleeder check valve, and accordingly the chamber 97 is always subject to the same pressures as the chamber 109. However, the spring 93 of the check valve is materially stronger than the spring 105 of the bleeder check valve and accordingly progressive increases in pressure occurring in a manner to be described will first permit actuation of the check valve diaphragm 90, due to its stronger spring 93 and will later permit the spring 105 of the bleeder check valve to operate the diaphragm 100.

With communication established through the various passages and conduits in the manner referred to, the diaphragm chambers of all four valves (excluding the lock-out valve) will be subject to partial vacuum to actuate the diaphragms in the several chambers. The diaphragm chambers 62 and 82 of the main valve and bleed valve respectively will be in direct communication with the intake manifold through the respective pipes 66 and 84, while the chambers 97 and 109 of the check valve and bleeder check valve respectively will be in communication both with the intake manifold and the conduit 23 of the power device in the manner described above.

It will be apparent that the valves will assume the positions referred to automatically and instantaneously upon the starting of the motor vehicle engine, and the operator is then ready to start the vehicle by placing it in low gear and depressing the accelerator pedal. The positions of the several valves under the starting condition referred to should be kept in mind for a clear understanding of the subsequent automatic operations. The movement imparted to the check valve causes the head 30 thereof to uncover the port 146 (the left hand end of the conduit 141 in Figure 11), thus opening communication from the atmosphere around the check valve shank 33, and thence to the main valve cylinder through passage 145 (see Figure 5) but communication will be broken at the main valve cylinder 26 since the operation of the associated diaphragm 54 will have moved the valve head 27 across the conduit 141 in Figure 11 to close communication from the passage 145 as viewed in Figure 5. Accordingly it will be apparent that the check valve will be in open position but no results follow the opening of such valve at this time due to the position of the head 27 of the main valve.

The vacuum communicated to the bleeder check valve 109 moves the head 45 thereof to afford communication between the conduits 131 and 137, passages 139 and 140 in Figure 10 while the shank 44 will be arranged in alinement with the conduit 141 to afford communication between the atmosphere and the bleed valve through the passage 142 and port 143 as shown in Figure 10. Atmospheric pressure however will not be communicated to the main valve cylinder 26 past the bleed valve, however, since actuation of the diaphragm of this valve moves the head 36 thereof into operative position to close communication between the passages 142 and 144 in Figure 10.

With the valves in such positions, it will be apparent that the main valve is completely cut off from communication with the atmosphere, but the manifold will be in communication with the conduit 23 due to the position of the shank 29 of the main valve, by virtue of which communication the power device 20 is being continued in operation under the conditions being considered. This condition will prevail so long as the engine is idling, and until the operator is ready to pass through the several gear shift positions into high gear. The operations incident to the placing of the vehicle in gear will now be referred to in detail.

With the clutch disengaged in the manner referred to, the operator moves the gear shift lever into low gear position, whereupon he slowly depresses the accelerator pedal to progressively open the butterfly valve 14. The orifice 67 leading to the diaphragm chamber of the main valve is opened almost immediately upon initial movement of the butterfly valve 14, thus affording communication between the orifice 67 and the atmosphere. The degree of vacuum existing below the edge of the butterfly valve adjacent the orifice 67 is negligible when the butterfly valve opens the orifice 67, and accordingly pressure at substantially that of the atmosphere will be admitted into the main valve diaphragm chamber 62, whereupon the associated spring 58 immediately moves the main valve to inoperative position, in which position the valve head 28 will promptly close the passage 125 leading to the intake manifold, but the space around the shank 29 will remain in communication with the passage 112 leading to the conduit 23 of the power device. At the same time, the valve head 27 (see Figure 5) will uncover the adjacent end of the passage 145, thus placing this passage in communication with passage 112.

Under the conditions being considered, the shank 33 of the check valve is in position to connect the port 146 to the passage 145, and with the main valve in the normal position to which it has returned, atmospheric air will be admitted through port 146, passage 145, around the main valve shank 29, through port 112 and thence into the power device 20 to release the movable element thereof. The clutch springs then promptly urge the clutch elements toward operative position, and the movement of the clutch elements will be completely checked at their initial point of engagement in accordance with the invention disclosed in the copending application of Edward G. Hill and Henry W. Hey, Serial No. 587,578, previously referred to.

The admission of air into the power device takes place in the manner referred to, and the degree to which pressure in the power device is increased depends on three factors, namely the area of the moving member of the power device, the speed of movement of such member transmitted thereto by the clutch springs, and the area of the smallest opening through which air passes into the power device. These three elements are so coordinated in the present apparatus that there is only a sufficient increase in pressure in the power device to permit the clutch springs to move the clutch elements and the moving element of the power device in the manner referred to.

The limited communication between the atmosphere and the power device is controlled by movement of the check valve head 30. When the air initially rushes into the power device in the manner referred to, the air also is communicated through the conduit 131 to the chamber 109 of the bleeder check valve and the chamber 97 of the check valve, and the pressure thus is increased in the latter chamber to permit the diaphragm 90 to drop under the influence of the spring 93. The tension of this spring is so adjusted that the increased pressure in the chamber 97, which is still below that of the atmosphere, is sufficient to stop the valve head 30 just before it closes communication between the port 146 and port 145 to thus limit the flow of air into the power device. While the conduit 137 under such conditions connects the conduit 131 to the intake manifold around the shank 46 of the bleeder check valve, the degree of communication afforded between the conduits 131 and 137 is not sufficient to prevent the desired increase in pressure in the chamber 97 due to the restricted space around the shank 46 of the bleeder check valve.

As previously stated, the pressure built up in the power device during movement toward the clutch engaging position is dependent on three factors, namely, the area of the moving element of the power device, its speed of movement, and the restricted opening through which air is admitted past the head 30 of the check valve. The proportionate relationship between these three factors is substantially constant from the fully disengaged clutch position to the point of initial engagement of the clutch elements, since such initial engagement retards the movement of the arm 18 and its connections to the moving member of the diaphragm. Under such conditions, the suction created tending to draw air into the power device is reduced, and the air admitted past the head 30 of the check valve is then sufficient to cause a further increase in pressure in the power device and in the passages leading thereto. Under such conditions there will be an increase in pressure in the conduit 131, chamber 109, conduit 136 and chamber 97, and this increase in pressure will be sufficient to permit the spring 93 to move the check valve head 30 to fully closed position thus preventing the further admission of air into the power device, and movement of the clutch elements will be completely checked. The operation referred to has been described as taking place at the point of initial engagement of the clutch elements. It will be apparent however, that the tension of the clutch springs and the inertia of the parts will tend to carry the clutch elements slightly past the exact point of initial engagement before the checking action takes place, although such action cannot take place prior to the point of initial engagement. Accordingly where such terms as "approximately" or "substantially" the point of initial engagement occur in the claims, it is understood that such expressions mean that the checking action takes place at or slightly past the exact point of initial engagement. In practice, it has been found that the checking action occurs before there is any appreciable transmission of power through the clutch.

Assuming that the operator depresses the accelerator only sufficiently to open the orifice 67 (Figure 2) the operation referred to will take place, the clutch elements moving to the point of initial engagement at which point their movement will be completely arrested. Assuming that the operator does not immediately further depress the accelerator pedal, the leakage through the conduit 137 will tend to somewhat retract the clutch elements to positively prevent engagement thereof. The shank 46 of the bleeder check valve under such conditions will afford restricted communication between the conduit 137 and the conduit 131 (through pipe 140 of Figure 11) and the conduit 131 communicates with the power device in the manner previously described. The slow rebuilding of vacuum in the power device exerts a holding back effect on the clutch elements, and at the same time the slightly increased vacuum in the conduit 131 will be communicated through chamber 109 and conduit 136 to the chamber 97. This decreased pressure in the chamber 96 of the check valve tends to open the check valve whereby the head 30 thereof will open very slowly to admit air into the conduit to the power device, thus balancing the increased vacuum created therein through communication between the conduits 131 and 137. A perfect balance is maintained between the increase in vacuum and the increase in air admission, and thus the clutch elements will be positively maintained at the point of initial engagement.

Under the conditions considered, it will be remembered that the bleeder check valve is in its upper position (as viewed in Figure 11) with the shank 46 providing a fixed leakage between the conduits 131 and 137 through the passage 140, and the shank 44 of the bleeder check valve is in a position to open communication between the atmosphere and the bleed valve cylinder 35. Referring to Figure 10, it will be noted that the bleeder check valve shank 44 affords communication between the port 143 and the passage 142. Up to this time, however, the bleed valve is still in closed position with the head 36 closing communication between the passages 142 and 144 of the conduit 141, since the bleed valve orifice 86 (Figure 2) has not yet been opened by the butterfly valve 14.

Assuming that the operator has placed the gear shift lever in low gear position and has depressed the accelerator so that the butterfly valve 14 is moved sufficiently to uncover the orifice 67, the conditions previously referred to will be present, and further opening movement of the butterfly valve 14 will result in permitting movement of the clutch elements into operative engagement. Referring to Figures 2 and 10, it will be apparent that the continued movement of the butterfly valve permits a progressive increase in pressure in the orifice 86 as the butterfly valve moves past this orifice and the space communicating with the atmosphere past the butterfly valve increases. This increased pressure in the orifice 86 is progressively communicated to the bleed valve diaphragm chamber 82 through pipe 84, passage 80, and passage 81. The progressive increase in pressure in the chamber 82 permits the spring 75 to move the bleed valve whereby its head 36 progressively uncovers the adjacent end of the passage 144. This operation will be apparent from a consideration of Figures 10 and 11, it being remembered that the bleeder check valve is still in its operative position with the shank 44 opening the conduit 141.

In this connection it will be remembered that the holding of the clutch elements at the point of initial engagement is accomplished through the maintenance of a sufficient vacuum in the power device to overcome to the proper extent the tension of the clutch springs, and this partial vacuum maintains the bleeder check valve diaphragm 100 in operative position against the tension of the relatively light spring 105. As the bleed valve head 36 then progressively opens the conduit 141 by progressively uncovering the passage 144, shown in Figure 10, air will be admitted at an increasing rate into the passage 144, through passage 145 to the main valve cylinder 26, and thence through passage 112 to the power device. The progressive increase in pressure in the power device permits the clutch elements to move into operative engagement, and the rate of engagement will take place in accordance with the rate of movement of the butterfly valve as will be apparent. Thus the vehicle will move forwardly due to the fact that the gear shift is in low gear position and the clutch elements are brought progressively into engagement with each other.

When sufficient momentum has been picked up by the vehicle, it merely is necessary for the operator to release the accelerator pedal, whereupon the butterfly valve will return to the normal position shown in Figure 2. Under such conditions, both of the orifices 67 and 86 will be again closed to the atmosphere, and the previous starting conditions will be restored wherein all of the diaphragms of the valve mechanism will be actuated to move their respective valves in the manner previously described. Thus the clutch will be again disengaged, and the vehicle may be placed in second gear and the operation repeated. The same operation is repeated for all gears as will be apparent, and accordingly the present apparatus permits the shifting of the gears without the usual foot operation of the clutch pedal 16.

The bleeder check valve plays an important part in controlling the proper operation of the apparatus for simulating every possible conventional operation of the clutch. For example, the restricted space provided around the shank 46 under the conditions previously described maintains a proper balance of air admission and vacuum to hold the clutch elements in the position of initial engagement if the operator merely moves the butterfly valve sufficiently to uncover the orifice 67 but not the orifice 86, thus corresponding to the condition in which the operator conventionally slightly increases the speed of the engine and holds the clutch pedal depressed to the point where the clutch elements are about to come into engagement. This condition is provided automatically with the present apparatus and is determined merely in accordance with the position of the butterfly valve with respect to the orifices 67 and 86.

Moreover, the admission of air into the power device around the bleed valve shank 38 as the clutch elements are brought into operative position gradually establishes atmospheric pressure in the power device which is communicated to the bleeder check valve 109 through passage 131, and when full clutch engagement takes place, the bleeder check valve will assume the position shown in Figure 11, the head 45 preventing the fixed leakage between the manifold and the power device by cutting off communication between the conduits 137 and 140. At the same time, the groove 42 of the bleeder check valve head 41 provides a fixed leakage to the atmosphere which overcomes any accidental vacuum leakages which otherwise would tend to exert a pull on the moving member of the power device. The leakage through the groove 42 thus prevents the apparatus from operating in such a manner as to "ride" the clutch.

Moreover, the operation of the bleeder check valve is highly important for the additional reason that it provides, under some conditions, a second checking point of the clutch elements to prevent the vehicle from lunging if the clutch elements are brought too suddenly into engagement by the too rapid opening of the bleed valve. As is well known, the movement of the clutch plates from the point of initial contact into final engagement does not take place through a considerable distance, but the distance of movement is quite appreciable. With the present apparatus, the clutch elements are checked at the point of initial engagement and their further movement is subject to the bleeding of air into the power device. Assuming that the vehicle is in low or intermediate gear and the operator depresses the accelerator pedal too rapidly for proper clutch engagement, the bleed valve may be moved very rapidly to the fully opened position shown in Figure 11 with the shank 38 affording substantial communication between the atmosphere and the power device. The relatively rapid movement of air under such conditions will permit the clutch plates to move toward engaged position from the initial checking point, but the same admission of air will be communicated through the conduit 131 to the chamber 109, thus permitting the spring 105 to promptly move the bleeder check valve to a position where communication between the bleed valve and the atmosphere is limited by the cross sectional area of the groove 42. This limiting of communication with the atmosphere again checks the movement of the clutch elements the instant before final clutch engagement takes place.

In practice, it has been found that this second checking point takes place with the clutch elements sufficiently in engagement with each other to transmit substantially the maximum torque to the driving wheels of the vehicle, but the second checking point takes place just prior to final clutch engagement, and the rapid speeding up of the motor of the vehicle under such conditions does not transmit a lunge to the vehicle due to the second checking of the clutch elements. The provision of the bleeder check valve accordingly is important since it provides automatically a remarkably smooth clutch operation without any attention on the part of the operator and prevents carelessness or inexperience on the part of the operator from causing the vehicle to jerk or lunge.

Of course, the bleeder check valve does not move substantially instantaneously to the position shown in Figure 11 when the operator relatively slowly depresses the accelerator pedal to progressively admit atmospheric air into the power device, and ordinarily, the bleeder check valve will move to the position shown in Figure 11 comparatively slowly. Under such conditions, it may be said that the bleed valve at all times controls the rate of clutch engagement after the initial checking point of the clutch plates unless accelerator operation takes place too rapidly, in which case the limited cross sectional area of the groove 42 determines the rate of clutch engagement in spite of carelessness or inexperienced operation of the accelerator.

The bleeder check valve improves the maneuverability of the vehicle to a remarkable degree. For example, it is the frequent practice when pulling out from a curb or similar place to permit partial clutch engagement as the motor is slightly increased in speed to permit the vehicle to move slowly outwardly into the line of traffic before permitting full clutch engagement and normal operation of the vehicle. The partial engagement of the clutch elements referred to ordinarily is controlled by foot operation of the clutch pedal, the pedal being held in partially depressed position determined by the judgment of the operator. With the present apparatus, the light spring 105 has its tension overcome by a relatively slight degree of vacuum, and accordingly the bleeder check valve does not move fully to the position shown in Figure 11 except when substantially atmospheric pressure is present in the conduit 131 under the conditions previously described. When initially starting the vehicle the accelerator pedal is slowly depressed, permitting a slow gradual flow of air into the power device past the bleed valve shank 38, and the admission of air under such conditions is partially neutralized by the fixed leakage provided past the bleeder check valve shank 46. If the speed of the motor is slightly increased by depression of the accelerator pedal, the clutch elements will be brought gradually into engagement with each other to permit a vehicle to move slowly outwardly from a curb or similar place, and if the operator "backs off" slightly on the accelerator, the admission of air past the bleed valve will be diminished by the increased vacuum acting through the orifice 86 adjacent the butterfly valve. In this case the fixed bleed past the bleeder check valve shank 46 will overcome the bleeding of air, and thus slightly retract the clutch elements, depending upon the degree to which the admission of air is overbalanced by the fixed leakage of vacuum.

If the motor speed is decreased by movement of the butterfly valve to the extent where vacuum will be reestablished in the orifice 86, the bleed valve will close completely, whereupon the fixed leakage around the valve shank 46 will reestablish a sufficient degree of vacuum in the power device to retract the clutch elements to the initial checking position. Any further increase of vacuum in the power device is then prevented for the reason that it would be communicated through conduit 131, chamber 109 and conduit 136 to the chamber 97 to draw the check valve upwardly as viewed in Figure 11 to the point where the head 30 would slightly open communication between the atmosphere and the power device to balance the vacuum leakage around the valve shank 46. Without foot operation of the clutch, therefore, the device provides the same degree of maneuverability which can be obtained through conventional operation, the retracting of the clutch elements to the initial checking point being dependent merely upon the slight retarding of the speed of the motor by partially releasing the accelerator pedal.

It will be apparent that the apparatus eliminates any mechanical connections whatever to any of the moving parts of the vehicle other than the single connection between the power device and the clutch pedal. No connections with the throttle or its associated parts are required, the device being wholly controlled by the uncovering of the orifices 67 and 86. Thus it will be apparent that the device may be located in any desired position with respect to the vehicle engine, it not being required that the valve mechanism be placed in such a position as to be connected to the throttle operating connections. The apparatus is fully automatic in operation to provide every maneuver possible with foot operation and it goes even further than is possible with foot operation in that it prevents the vehicle from jerking or lunging if the accelerator is operated too rapidly in proportion to the vehicle speed.

It is to be understood that the form of my invention herewith shown and described is to be taken as a preferred example of the same and that various changes in the shape, size, and arrangement of parts may be resorted to without departing from the spirit of the invention or the scope of the subjoined claims.

I claim:

1. Motor vehicle control apparatus comprising a power device connected to the motor vehicle clutch, control means for connecting the power device to a source of power for rendering the power device operative to move the clutch elements to inoperative position and for variably rendering the power device ineffective for holding the clutch elements in inoperative position to release the clutch elements for variable return movement to engaged position, and automatic means responsive to the rate at which the power device is rendered ineffective for holding the clutch elements in inoperative position, to retard the movement of the clutch elements as they pass substantially the point of initial engagement.

2. Motor vehicle control apparatus comprising a power device connected to the motor vehicle clutch, a control device for rendering the power device operative to move the clutch elements to inoperative position and for releasing the clutch elements for movement toward operative position, means operative when the clutch elements reach approximately the point of initial engagement for determining their rate of movement into operative engagement, and means automatically operative for retarding the movement of the clutch elements into operative engagement when said last named means releases the clutch elements for relatively rapid movement toward engaged position.

3. Motor vehicle control apparatus comprising a power device connected to the motor vehicle clutch, a control device for rendering the power device operative to move the clutch elements to inoperative position and for releasing the clutch elements for movement toward operative position, means operative in conjunction with said control device for checking the movement of the clutch elements as they reach an intermediate position substantially at the point of initial engagement, means operative for releasing the clutch elements for variable speed movement into operative engagement after their movement has been checked at such intermediate point, and means automatically operative for retarding the movement of the clutch elements into operative engagement if said last named means releases the clutch elements for relatively rapid movement toward engaged position.

4. Motor vehicle control apparatus comprising a differential pressure power device having a movable member connected to the motor vehicle clutch, control valve mechanism for connecting the power device to a source of differential pressure for rendering the power device operative to move the clutch elements to inoperative position and for variably rendering the power device ineffective for holding the clutch elements in inoperative position to release the clutch elements for variable return movement to engaged position, and automatic means responsive to the rate at which the power device is rendered ineffective for holding the clutch elements in inoperative position to retard the movement of the clutch elements as they pass substantially the point of initial engagement.

5. Motor vehicle control apparatus comprising a differential pressure power device having a movable member connected to the motor vehicle clutch, control valve means for rendering the power device operative to move the clutch elements to inoperative position and for releasing the clutch elements for movement toward operative position, auxiliary valve means for determining the rate of movement of the clutch elements into operative engagement with each other, and automatic valve means operative for retarding the movement of the clutch elements into operative engagement if said auxiliary valve means releases the clutch elements for relatively rapid movement toward engaged position.

6. Motor vehicle control apparatus comprising a differential pressure power device having a movable member connected to the motor vehicle clutch, a control valve device for rendering the power device operative to move the clutch elements to inoperative position, and for releasing the clutch elements for movement toward operative position, a checking valve operative in conjunction with said control valve device for checking the movement of the clutch elements as they reach an intermediate position substantially at the point of initial engagement, auxiliary valve means operative for releasing the clutch elements for variable speed movement into operative engagement after their movement has been checked at such intermediate point, and automatic valve means operative for retarding the movement of the clutch elements into operative engagement if such auxiliary valve means releases the clutch elements for relatively rapid movement toward engaged position.

7. Motor vehicle control apparatus comprising a differential pressure power device connected to the motor vehicle clutch, a main valve movable to operative position to disconnect the power device from the atmosphere and to connect it to the intake manifold to move the clutch elements to inoperative position, said main valve being movable back to normal position to disconnect the power device from the intake manifold and connect it to the atmosphere to release the clutch elements for movement toward operative position, a checking valve operative for disconnecting the power device from the atmosphere when the clutch elements reach approximately the point of initial engagement for checking the movement of the clutch elements at such point, a bleed valve for admitting air into said power device at a controlled rate after the movement of the clutch elements has been checked for controlling the rate of movement of the clutch elements into operative engagement with each other, and a bleeder check valve operative for rendering said bleed valve ineffective for permitting movement of the clutch elements relatively rapidly into operative engagement.

8. Apparatus constructed in accordance with claim 7 provided with a conduit connected between the main valve and the atmosphere and in which said bleed valve is arranged, said bleeder check valve being arranged in said conduit and operative for restricting the passage of air through said conduit upon relatively rapid operation of said bleed valve tending to supply air relatively rapidly to said power device.

9. Apparatus constructed in accordance with claim 7 provided with a conduit connected between the main valve and the atmosphere and in which said bleed valve is arranged, said bleeder check valve being arranged in said conduit and movable to closed position therein upon relatively rapid operation of said bleed valve, said bleeder check valve being provided with a relatively small passage affording restricted communication through said conduit when said bleeder check valve is in closed position.

10. Apparatus constructed in accordance with claim 7 provided with resilient means tending to urge said bleeder check valve to closed position, a pressure chamber communicating with said power device, a pressure responsive element connected to the bleeder check valve and arranged in said pressure chamber to be influenced by differential pressure therein whereby said resilient means will move said bleeder check valve to closed position to restrict the supply of air to said power device upon a predetermined substantial decrease in differential pressure in the power device after movement of the clutch elements has been checked.

11. Motor vehicle control apparatus comprising a differential pressure power device connected to the motor vehicle clutch, a main valve movable to operative position to disconnect the power device from the atmosphere and to connect it to the intake manifold to move the clutch elements to inoperative position, said main valve being movable back to normal position to disconnect the power device from the intake manifold and connect it to the atmosphere to release the clutch elements for movement toward operative position, a checking valve operative for disconnecting the power device from the atmosphere when the clutch elements reach approximately the point of initial engagement for checking the movement of the clutch elements at such point, a bleed valve for admitting air into said power device at a controlled rate after the movement of the clutch elements has been checked for controlling the rate of movement of the clutch elements into operative engagement with each other, a bleeder check valve, and means controlled by differential pressure in said power device for moving said bleeder check valve to closed position to render said bleed valve inoperative if it operates to decrease the pressure differential in said power device relatively rapidly.

12. Motor vehicle control apparatus comprising a differential pressure power device having a movable member connected to the motor vehicle clutch and including a suction chamber, a main valve movable between normal and operative positions to respectively connect said suction chamber to the atmosphere and to a source of partial vacuum to move the clutch elements to inoperative position, said main valve being biased to normal position, means for moving said main valve to operative position, a checking valve responsive to pressure in said suction chamber and movable to closed position to disconnect said suction chamber from the atmosphere upon an increase in pressure in said suction chamber to a predetermined point caused by movement of the clutch elements into initial engagement after said main valve has moved to normal position, to check the movement of the clutch elements at such point, a bleed valve movable in one direction for progressively connecting said suction chamber to the atmosphere after the clutch elements have been checked at such point, and means operative for progressively reducing pressure in said suction chamber upon movement of said bleed valve in the other direction.

13. Apparatus constructed in accordance with claim 12 wherein said means comprises a conduit affording restricted communication between said suction chamber and the intake manifold.

14. Apparatus constructed in accordance with claim 12 provided with means responsive to pressures in said suction chamber for rendering said last named means inoperative when the pressure present in said suction chamber is greater than that necessary for moving the clutch elements toward disengaged position.

15. Apparatus constructed in accordance with claim 12 wherein said means comprises a conduit affording restricted communication between said suction chamber and the atmosphere, and means responsive to pressures in said suction chamber for closing said conduit when the pressure present in said suction chamber is greater than that necessary for moving the clutch elements toward disengaged position.

16. Apparatus constructed in accordance with claim 12 provided with means for checking the movement of the clutch elements just prior to final engagement thereof when said bleed valve is moved to admit air relatively rapidly into said suction chamber.

17. Apparatus constructed in accordance with claim 12 provided with means for restricting communication between said suction chamber and the atmosphere if said bleed valve is moved to admit air relatively rapidly into said suction chamber.

18. Apparatus constructed in accordance with claim 12 provided with a bleeder check valve operative for restricting communication between said suction chamber and the atmosphere through said bleed valve, and means responsive to pressure in said suction chamber for rendering said bleeder check valve operative if said bleed valve is moved to admit air relatively rapidly into said suction chamber.

19. Motor vehicle control apparatus comprising a differential pressure power device having a movable member connected to the motor vehicle clutch and including a suction chamber, a main valve movable between normal and operative positions to respectively connect said suction chamber to the atmosphere and to a source of partial vacuum to move the clutch elements to inoperative position, said main valve being biased to normal position, means for moving said main valve to operative position, a checking valve responsive to pressure in said suction chamber and movable to closed position to disconnect said suction chamber from the atmosphere upon an increase in pressure in said suction chamber to a predetermined point caused by movement of the clutch elements into initial engagement after said main valve has moved to normal position, to check the movement of the clutch elements at such point, a bleed valve movable in one direction for progressively connecting said suction chamber to the atmosphere after the clutch elements have been checked at such point, means for retarding the movement of the clutch elements just prior to final engagement thereof when said bleed valve is moved to admit air relatively rapidly into said suction chamber, and a conduit affording restricted communication between said suction chamber and the intake manifold.

20. Apparatus constructed in accordance with claim 19 wherein said means comprises a valve for restricting communication between said suction chamber and the atmosphere if said bleed valve is moved to admit air relatively rapidly into said suction chamber, and a valve arranged in said conduit and responsive to pressures in said suction chamber to close said conduit when the suction in said suction chamber is insufficient to move the clutch elements toward disengaged position.

21. Motor vehicle control apparatus comprising a power device connected to a motor vehicle clutch, control means for rendering the power device operative to move the clutch elements to inoperative position and for releasing them for return movement toward engaged position, means automatically operative substantially at the point of initial engagement of the clutch elements for checking the movement of such elements, means movable in one direction for releasing the clutch elements for movement into operative engagement after their movement has been checked, and means operative upon movement of said last named means in the other direction for effecting operation of the power device to retract the clutch elements toward their point of initial engagement.

22. Motor vehicle control apparatus comprising a differential pressure power device having a movable member connected to the motor vehicle clutch, control valve mechanism for rendering the power device operative to move the clutch elements to inoperative position and for releasing them for return movement toward engaged position, automatic means operative substantially at the point of initial engagement of the clutch elements for checking the movement of such elements, a valve movable in one direction for releasing the clutch elements for movement toward operative engagement after their movement has been checked, and automatic means operative upon movement of said valve in the other direction for rendering said power device operative for retracting the clutch elements toward their point of initial engagement.

23. Motor vehicle control apparatus comprising a differential pressure power device having a movable member connected to the motor vehicle clutch, control valve mechanism for rendering the power device operative to move the clutch elements to inoperative position and for releasing them for return movement toward engaged position, automatic means operative substantially at the point of initial engagement of the clutch elements for checking the movement of such elements, a bleed valve movable in one direction to progressively establish pressure equalization in the power device to permit the clutch elements to move into operative engagement after their movement has been checked, and a restricted bleed conduit tending to reestablish pressure differential in the power device and operative for rendering the power device operative for retracting the clutch elements toward their point of initial engagement upon movement of said bleed valve in the other direction.

24. The combination with a motor vehicle clutch, of a power device connected to the clutch, a control device for rendering the power device operative to move the clutch elements to inoperative position and for releasing the clutch elements for movement toward operative position, means operative when the clutch elements reach approximately the point of initial engagement for determining their rate of movement into operative engagement, and means automatically operative for retarding the movement of the clutch elements into operative engagement when said last named means releases the clutch elements for relatively rapid movement toward engaged position.

25. The combination with a motor vehicle clutch, of a power device connected to the clutch, a control device for rendering the power device operative to move the clutch elements to inoperative position and for releasing the clutch elements for movement toward operative position, means operative in conjunction with said control device for checking the movement of the clutch elements as they reach an intermediate position substantially at the point of initial engagement, means operative for releasing the clutch elements for variable speed movement into operative engagement after their movement has been checked at such intermediate point, and means automatically operative for retarding the movement of the clutch elements into operative engagement if said last named means releases the clutch elements for relatively rapid movement toward engaged position.

26. The combination with a motor vehicle clutch, of a differential pressure power device having a movable member connected to the clutch, control valve mechanism for connecting the power device to a source of differential pressure for rendering the power device operative to move the clutch elements to inoperative position and for variably rendering the power device ineffective for holding the clutch elements in inoperative position to release the clutch elements for variable return movement to engaged position, and automatic valve means responsive to the rate at which the power device is rendered ineffective for holding the clutch elements in inoperative position to retard the movement of the clutch elements as they pass substantially the point of initial engagement.

27. The combination with a motor vehicle clutch, of a differential pressure power device having a movable member connected to the clutch, control valve means for rendering the power device operative to move the clutch elements to inoperative position and for releasing the clutch elements for movement toward operative position, auxiliary valve means for determining the rate of movement of the clutch element into operative engagement with each other, and automatic valve means operative for retarding the movement of the clutch elements into operative engagement if said auxiliary valve means releases the clutch elements for relatively rapid movement toward engaged position.

28. The combination with a motor vehicle clutch, of a differential pressure power device having a movable member connected to the clutch, a control valve device for rendering the power device operative to move the clutch elements to inoperative position, and for releasing the clutch elements for movement toward operative position, a checking valve operative in conjunction with said control valve device for checking the movement of the clutch elements as they reach an intermediate position substantially at the point of initial engagement, auxiliary valve means operative for releasing the clutch elements for variable speed movement into operative engagement after their movement has been checked at such intermediate point, and automatic valve means operative for retarding the movement of the clutch elements into operative engagement if such auxiliary valve means releases the clutch elements for relatively rapid movement toward engaged position.

29. The combination with a motor vehicle engine having a clutch and an intake manifold, of a differential pressure power device connected to the clutch, a main valve movable to operative position to disconnect the power device from the atmosphere and to connect it to the intake manifold to move the clutch elements to inoperative position, said main valve being movable back to normal position to disconnect the power device from the intake manifold and connect it to the atmosphere to release the clutch elements for movement toward operative position, a checking valve operative for disconnecting the power device from the atmosphere when the clutch elements reach approximately the point of initial engagement for checking the movement of the clutch elements at such point, a bleed valve for admitting air into said power device at a controlled rate after the movement of the clutch elements has been checked, for controlling the rate of movement of the clutch elements into operative engagement with each other, and a bleeder check valve operative for rendering said bleed valve ineffective for permitting movement of the clutch elements relatively rapidly into operative engagement.

30. The combination set forth in claim 29 provided with a conduit connected between the main valve and the atmosphere and in which said bleed valve is arranged, said bleeder check valve being arranged in said conduit and operative for restricting the passage of air through said conduit upon relatively rapid operation of said bleed valve tending to supply air relatively rapidly to said power device.

31. The combination set forth in claim 29 provided with a conduit connected between the main valve and the atmosphere and in which said bleed valve is arranged, said bleeder check valve being arranged in said conduit and movable to closed position therein upon relatively rapid operation of said bleed valve, said bleeder check valve being provided with a relatively small passage affording restricted communication through said conduit when said bleeder check valve is in closed position.

32. The combination set forth in claim 29 provided with resilient means tending to urge said bleeder check valve to closed position, a pressure chamber communicating with said power device, a pressure responsive element connected to the bleeder check valve and arranged in said pressure chamber to be influenced by differential pressure therein whereby said resilient means will move said bleeder check valve to closed position to restrict the supply of air to said power device upon a predetermined substantial decrease in differential pressure in the power device after movement of the clutch elements has been checked.

33. The combination with a motor vehicle engine having a clutch and an intake manifold, of a differential pressure power device connected to the clutch, a main valve movable to operative position to disconnect the power device from the atmosphere and to connect it to the intake manifold to move the clutch elements to inoperative position, said main valve being movable back to normal position to disconnect the power device from the intake manifold and connect it to the atmosphere to release the clutch elements for movement toward operative position, a checking valve operative for disconnecting the power device from the atmosphere when the clutch elements reach approximately the point of initial engagement for checking the movement of the clutch elements at such point, a bleed valve for admitting air into said power device at a controlled rate after the movement of the clutch elements has been checked, for controlling the rate of movement of the clutch elements into operative engagement with each other, a bleeder check valve, and means controlled by differential pressure in said power device for moving said bleeder check valve to a predetermined position to render said bleed valve inoperative if it operates to decrease the pressure differential in said power device relatively rapidly.

34. The combination with a motor vehicle engine having a clutch and an intake manifold, of a differential pressure power device having a movable member connected to the motor vehicle clutch and including a suction chamber, a main valve movable between normal and operative positions to respectively connect said suction chamber to the atmosphere and to a source of partial vacuum to move the clutch elements to inoperative position, said main valve being biased to normal position, means for moving said main valve to operative position, a checking valve responsive to pressure in said suction chamber and movable to closed position to disconnect said suction chamber from the atmosphere upon an increase in pressure in said suction chamber to a predetermined point caused by movement of the clutch element into initial engagement after said main valve has moved to normal position, to check the movement of the clutch elements at such point, a bleed valve movable in one direction for progressively connecting said suction chamber to the atmosphere after the clutch elements have been checked at such point, and means operative for progressively reducing pressure in said suction chamber upon movement of said bleed valve in the other direction.

35. The combination set forth in claim 34 wherein said last named means comprises a conduit affording restricted communication between said suction chamber and the intake manifold.

36. The combination set forth in claim 34 provided with means responsive to pressures in said suction chamber for rendering said last named means inoperative when the pressure present in said suction chamber is greater than that necessary for moving the clutch elements toward disengaged position.

37. The combination set forth in claim 34 wherein said last named means comprises a conduit affording restricted communication between said suction chamber and the atmosphere, and means responsive to pressures in said suction chamber for closing said conduit when the pressure present in said suction chamber is greater than that necessary for moving the clutch elements toward disengaged position.

38. The combination set forth in claim 34 provided with means for checking the movement of the clutch elements just prior to final engagement thereof when said bleed valve is moved to admit air relatively rapidly into said suction chamber.

39. The combination set forth in claim 34 provided with means for restricting communication between said suction chamber and the atmosphere if said bleed valve is moved to admit air relatively rapidly into said suction chamber.

40. The combination set forth in claim 34 provided with a bleeder check valve operative for restricting communication between said suction chamber and the atmosphere through said bleed valve, and means responsive to pressure in said suction chamber for rendering said bleeder check valve operative if said bleed valve is moved to admit air relatively rapidly into said suction chamber.

41. The combination with a motor vehicle engine having a clutch and an intake manifold, of a differential pressure power device having a movable member connected to the motor vehicle clutch and including a suction chamber, a main valve movable between normal and operative positions to respectively connect said suction chamber to the atmosphere and to a source of partial vacuum to move the clutch elements to inoperative position, said main valve being biased to normal position, means for moving said main valve to operative position, a checking valve responsive to pressure in said suction chamber and movable to closed position to disconnect said suction chamber from the atmosphere upon an increase in pressure in said suction chamber to a predetermined point caused by movement of the clutch elements into initial engagement after said main valve has moved to normal position, to check the movement of the clutch elements at such point, a bleed valve movable in one direction for progressively connecting said suction chamber to the atmosphere after the clutch elements have been checked at such point, means for retarding the movement of the clutch elements just prior to final engagement thereof when said bleed valve is moved to admit air relatively rapidly into said suction chamber, and a conduit affording restricted communication between said suction chamber and the intake manifold.

42. The combination set forth in claim 41 wherein said last named means comprises a valve for restricting communication between said suction chamber and the atmosphere if said bleed valve is moved to admit air relatively rapidly into said suction chamber, and a valve arranged in said conduit and responsive to pressures in said suction chamber to close said conduit when the suction in said suction chamber is insufficient to move the clutch elements toward disengaged position.

43. The combination with a motor vehicle engine having a clutch, an intake manifold and a throttle valve therein, of a differential pressure power device having a movable member connected to the motor vehicle clutch, a main valve movable between normal and operative positions to respectively connect said power device to the atmosphere and to a source of partial vacuum to move the clutch elements to inoperative position, said main valve being biased to normal position, a pressure chamber, a pressure responsive member in said chamber connected to said main valve, a conduit connected between said pressure chamber and the intake manifold adjacent the throttle valve to move said main valve to operative position upon the substantial closing of the throttle valve, means for checking the movement of the clutch elements as they reach substantially the point of initial engagement when the throttle valve is opened to release said main valve for movement to normal position, a bleed valve movable from closed position for progressively connecting said power device to the atmosphere after the clutch elements have been checked at such point, a pressure responsive member connected to said bleed valve, a pressure chamber in which said pressure responsive member is arranged, and a conduit connecting said last named pressure chamber to the intake manifold adjacent the throttle valve whereby said bleed valve will be progressively moved from closed position upon the progressive opening of the throttle valve.

44. The combination with a motor vehicle clutch, of a power device connected to the clutch, control means for rendering the power device operative to move the clutch elements to inoperative position and for releasing them for return movement toward engaged position, means automatically operative substantially at the point of initial engagement of the clutch elements for checking the movement of such elements, means movable in one direction for releasing the clutch elements for movement into operative engagement after their movement has been checked, and means operative upon movement of said last named means in the other direction for effecting operation of the power device to retract the clutch elements toward the point of initial engagement.

45. The combination with a motor vehicle clutch, of a differential pressure power device having a movable member connected to the clutch, control valve mechanism for rendering the power device operative to move the clutch elements to inoperative position and for releasing them for return movement toward engaged position, automatic means operative substantially at the point of initial engagement of the clutch elements for checking the movement of such elements, a valve movable in one direction for releasing the clutch elements for movement toward operative engagement after their movement has been checked, and automatic means operative upon movement of said valve in the other direction for rendering said power device operative for retracting the clutch elements toward their point of initial engagement.

46. The combination with a motor vehicle clutch, of a differential pressure power device having a movable member connected to the clutch, control valve mechanism for rendering the power device operative to move the clutch elements to inoperative position and for releasing them for return movement toward engaged position, automatic means operative substantially at the point of initial engagement of the clutch elements for arresting the movement of such elements, a bleed valve movable in one direction to progressively establish pressure equalization in the power device to permit the clutch elements to move into operative engagement after their movement has been checked, and a restricted bleed conduit tending to reestablish pressure differential in the power device and operative for rendering the power device operative for retracting the clutch elements toward the point of initial engagement upon movement of said bleed valve in the other direction.

EDWARD G. HILL.